(12) United States Patent
Young et al.

(10) Patent No.: US 6,709,510 B1
(45) Date of Patent: Mar. 23, 2004

(54) PROCESS FOR USING MILL SCALE IN CEMENT CLINKER PRODUCTION

(75) Inventors: Rom D. Young, Dallas, TX (US); David Norris, Apple Valley, CA (US)

(73) Assignee: Texas Industries, Inc., Dallas, TX (US)

( * ) Notice: Subject to any disclaimer, the term of this patent is extended or adjusted under 35 U.S.C. 154(b) by 0 days.

(21) Appl. No.: 10/299,250

(22) Filed: Nov. 19, 2002

(51) Int. Cl.[7] ................................................ C04B 7/36
(52) U.S. Cl. ...................................... 106/745; 106/739
(58) Field of Search ................................ 106/745, 739

(56) References Cited

U.S. PATENT DOCUMENTS

| | | |
|---|---|---|
| 530,247 A | 12/1894 | Stein |
| 982,945 A | 1/1911 | Forell |
| 998,358 A | 7/1911 | Lessing |
| 1,073,820 A | 9/1913 | Richards |
| 1,775,313 A | 9/1930 | Lellep |
| 2,471,562 A | 5/1949 | Fitterer |
| 2,600,515 A | 6/1952 | Mooser |
| 3,017,246 A | 1/1962 | Kamlet |
| 3,801,339 A * | 4/1974 | Ogura et al. |
| 3,923,717 A | 12/1975 | Lalk et al. |
| 4,026,717 A | 5/1977 | Harris et al. |
| 4,054,464 A | 10/1977 | Thorn, Jr. et al. |
| 4,124,404 A | 11/1978 | Suzuki et al. |
| 4,126,480 A | 11/1978 | MacWilliams et al. |
| 4,174,961 A | 11/1979 | Wolfs et al. |
| 4,174,974 A | 11/1979 | Fondriest |
| 4,191,546 A | 3/1980 | Kroyer |
| 4,213,791 A | 7/1980 | Wilson, Sr. |
| 4,342,598 A | 8/1982 | Kogan |
| 5,156,676 A | 10/1992 | Garrett et al. |
| 5,374,309 A | 12/1994 | Piniecki |
| 5,393,342 A | 2/1995 | Hooykaas |
| 5,421,880 A | 6/1995 | Young |
| 5,494,515 A * | 2/1996 | Young .................. 106/745 |
| 5,853,474 A * | 12/1998 | Hilton .................. 106/697 |
| 5,944,870 A * | 8/1999 | Edlinger .................. 588/207 |
| 6,361,596 B1 * | 3/2002 | Vidrio et al. .................. 106/739 |
| 6,491,751 B1 * | 12/2002 | Watson .................. 106/756 |

FOREIGN PATENT DOCUMENTS

| | | |
|---|---|---|
| DE | 2829370 | 1/1979 |
| DE | 2833857 | 2/1980 |
| DE | 151150 | 10/1981 |
| DE | 3609568 | 9/1987 |
| DE | 3633736 | 4/1988 |
| EP | 0034690 | 9/1981 |
| EP | 0162215 | 11/1985 |
| EP | 0171253 | 2/1986 |
| EP | 0188618 | 7/1986 |

(List continued on next page.)

OTHER PUBLICATIONS

"Production and Properties of Alinite Cements From Steel Plant Wastes" Pradie et al., Cement and Concrete Research (1990), 20 (1), p15–24, 1990.*

(List continued on next page.)

Primary Examiner—Paul Marcantoni
(74) Attorney, Agent, or Firm—Jones Day

(57) ABSTRACT

A process for forming cement clinker using mill scale that may have hydrocarbons associated therewith. Normal feedstock material is preheated and then transferred to a combustion area. The mill scale is also transferred to the combustion area where, during the process of burning a material, the unwanted hydrocarbons are volatilized and converted to harmless gaseous products (by combustion) that can be passed to the atmosphere. The combustion area may be a precalciner or may be the feed end of the rotary kiln if the rotary kiln has an adequate temperature profile. The remaining mill scale and feedstock material are thoroughly mixed and blended and the mill scale is diffused and combined with the feedstock material as the mill scale and the feedstock material move from the feed end toward the heat-source end of the rotary kiln to form cement clinker.

10 Claims, 1 Drawing Sheet

FOREIGN PATENT DOCUMENTS

| | | |
|---|---|---|
| EP | 0312323 | 4/1989 |
| EP | 0397862 | 4/1990 |
| EP | 0375081 | 6/1990 |
| EP | 0393189 | 10/1990 |
| FR | 2480136 | 10/1981 |
| FR | 2486066 | 1/1982 |
| FR | 2681592 | 3/1993 |
| GB | 2208857 | 4/1989 |
| GB | 2211182 | 6/1989 |
| JP | 267142 | 10/1900 |
| JP | 13794 | 8/1967 |
| JP | 30103 | 9/1970 |
| JP | 21420 | 2/1979 |
| JP | 57529 | 5/1979 |
| JP | 69137 | 6/1979 |
| JP | 90449 | 7/1980 |
| JP | 149359 | 11/1981 |
| JP | 223649 | 12/1983 |
| JP | 13652 | 1/1984 |
| JP | 48472 | 8/1984 |
| JP | 54948 | 3/1985 |
| JP | 192440 | 7/1990 |
| JP | 224147 | 8/1990 |
| PL | 139135 | 7/1987 |
| RU | 1167164 A | 7/1983 |
| SU | 513950 | 5/1976 |
| SU | 610813 | 6/1978 |
| SU | 772394 | 10/1980 |
| SU | 658102 | 3/1981 |
| SU | 969692 | 10/1982 |
| SU | 1206247 | 1/1986 |
| SU | 1079624 | 7/1986 |
| SU | 1447774 * | 12/1988 |
| SU | 1608155 | 11/1990 |
| WO | WO-8301443 | 4/1983 |
| WO | WO-8601795 | 3/1986 |
| WO | WO-8904815 | 6/1989 |
| WO | WO-9003343 | 4/1990 |
| WO | WO-9003344 | 4/1990 |
| WO | WO-9104953 | 4/1991 |

OTHER PUBLICATIONS

ACI Committee, "*Ground Granulated Blast–Furnace Slag as a Cementitious Constituent in Concrete,*" 1R–1–226.1R–15, ACI, p. 226, (No month) 1987.

ASTM Committee, "*Standard Specification for Ground Granulated Blast–Furnace Slag for Use in Concrete and Mortars,* " ASTM, pp. 495–499, Jun. 1989.

Maslehuddin et al., "*Corrosion of Reinforcing Steel in Concrete Containing Slag or Pozzolans,* " ASTM, pp. 24–31, (No month) 1990.

Douglas et al., "*Characterization of Ground Granulated Blast–Furnace Slags and Fly Ashes and Their Hydration in Portland Cement Blends,*" ASTM, pp. 38–46, (No month) 1990.

Sarkar et al., "*Synergistic Roles of Slag and Silica Fume in Very High Strength Concrete,*" ASTM, pp. 32–37, (No month) 1990.

Cowan et al., "*Conversion of Drilling Fluids to Cements with Blast Furnish Slag: Performance Properties and Applications for Well Cementing,* " Society of Petroleum Engineers, pp. 277–288 (Date unknown).

"*Engineering and Design —Standard Practice for Concrete,*" 2–2 and 2–10, Department of the Army, Corps of Engineers, Sep. 5, 1985.

"*Hydraulic Cements—Adhesives,* " The New Encyclopedia Britannica, vol. 13, pp. 11–14 (Date unknown).

V. D. Barbanyage et al., "*Characteristics of the Sintering Process of Cement Mixes,* " Belgorod Technological Institute of Construction Materials, Tsement, No. 2, pp. 21–24, (No month) 1993.

Geiseler, Jurergen, "*Utilization of Steel Works Slag,* " presented at the Ironworks Day on Nov. 5, 1990, in Duesseldorf, Stahl u. Eisen 111, No. 1, 133–138, 1991.

E. G. Drevitskii et al., Excerpt from "*Increasing Operating Efficiency of Rotary Kilns,* " Moscow, Stroiizdat, pp. 98–101, (No month) 1990.

A. P. Vitushkin et al., "*Saving Fuel and Energy Resources in Cement Production,* " Report from an All–Union Seminar, Tsement, No. 2, pp. 8–9, (No month) 1988.

A. A. Pachchenko et al., "*Clinker Formation in Unground Raw Material Mixes,* " Kiev Polytechnic Institute, Tsement, 4:20–21, (No month) 1987.

"*Clinker formation in oxide–salt melts,* " Recommendations on Development of New Processing Operations, Excerpt from *Cement Industry*, Review Information No. 1, Moscow, pp. 43–49, 58–60, (No month) 1987.

Yu.G. Ench et al, "*Sulfate–Resistance Portland Cement Based on Ferruginous Waste Slags,*" Yuzhgiprotsement, Source Not Available, pp. 14–15 (Date unknown).

*Pulse Technology in Cement Production*, Source Not Available, (Date unknown).

Yu. G. Ench et al., "*Physicochemical Processes Occurring During Firing of a Raw Material Charge with Addition of Slag,*" Yuzhgiprotsement, Tsement, No. 3, pp. 9–11, (No month) 1984.

N. P. Kogan et al., "*Effect of Self–Decomposing Waste Blast Furnace Slag on Firing of Cement Clinker,*" New Trends in Itensification and Investigation of Clinker Firing and Cement Industry, No. 76, Moscow, pp. 110–115, (No month) 1983.

R.M. Dzvonkovskii et al., "*New Energy–Saving Clinker Firing Process (S–Firing),*" New Trends in Intensification and Investigation of Clinker Firing and Cement Setting Processes, Transactions of the State All–Union Scientific research of the Cement Industry, No. 76, Moscow, pp. 90–96, (No month) 1983.

M.V. Babich et al., "*Optimization of Composition of Raw Material Mixes for Firing of Clinkers in Kilns of the Dry Method of Production,*" New Trends in Intensification and Investigation of Clinker Firing and Cement Setting Processes, Transactions of the State All–Union Scientific research of the Cement Industry, No. 76, Moscow, pp. 52–58, (No month) 1983.

R.I. Timchenko et al., "*Intensification of Firing Process by Using Components with Increased Chemical Energy in the Composition of a Raw Material Mix,*" New Trends in Intensification and Investigation of Clinker Firing and Cement Setting Processes, Transactions of the State All–Union Scientific research of the Cement Industry, No. 76, Moscow, pp. 40–51, (No month) 1983.

A. I. Zdorov et al., "*Use of Industrial Wastes in Cement Production* "Yuzhgiprotsement Tsement, No. 7, pp. 9–10, (No month) 1983.

V. L. Bernshtein et al., "*Use of Metallurgical Wastes in Cement Production, Yuzhgiprotsement, Use of Technogenic Materials in Cement Production,*" Transactions of the State All–Union Scientific Research Institute of the Cement Industry, Moscow, pp. 23–29, (No month) 1982.

Author(s) Unknown, "*Use of Copper–Smelting Slags in Cement Production*," Cement Industries, Series 1 (Review Information), No. 1, Moscow, pp. 3–27, (No month) 1981.

V. A. P'yachev, "*Effective Ferruginous Raw Material for Clinker Production*," Tsement, No. 5, May 1981.

V. A. P'yachev et al., "*Use of Slags From Oxidized Nickel Ores in the Production of Clinker*," Kompleksnoe ispol'zovanie miner'nogo syr'ya, 6:32–36, (No month) 1980.

R. Dogandzhieva et al., "*Use of Slags from the Kreikovets Integrated Iron and Steel Works in the Production of Portland Cement Clinker*," Transactions of the 5th All–Union Scientific–Technical Conference on Chemistry and Technology of Cement, Moscow, pp. 160–163, (No month) 1980.

B. V. Volkonskii et al., "*Problems of Use of Technogenic Byproducts and Industrial Wastes in Cement Production*," Transactions of the 5th All–Union Scientific–Technical Conference on Chemistry and Technology of Cement, Moscow, pp. 142–144 (No month) 1980.

S. A. Sad'kova et al., "*Improvement of Properties of Loess Brick*," Stroit Mater, 7:12, (No month) 1980.

A. S. Saduakasov et al., "*Electrothermophosphorus Slag–Raw Material for Production of Binders and Refractories*," Kompleksnoe Ispol'zovanie mineral'nogo syr'ya, 1:51–56, (No month) 1980.

V. I. Zhrko, "*Effectiveness of Additional Supply of Blast Furnace Slag to the Kiln*," Tsement, 11:8, (no matter) 1978.

V. A. P'yachev et al., "*Highly Basic Blast Furnace Slag As a Raw Material Component in the Production of Cement Clinker,*" Slags of Furnace Metalurgy, Transactions of the Ural Scientific Research Institute of Iron and Steel, 25:99–106, 1976.

Von M. Schmidt, "*Cement wih interground additivies–capabilities and environmental relief*," Zement–Kalk–Gips, vol. 45, Edition B, pp. 64–69, (English version), Apr. 1992.

Von M.E. Asim, "*Blastfurnace Slag Processing to Blended Cements*," Zement–Kalk–Gips, Edition B (English version), pp. 519–528, Dec. 1992.

Von J. Stark et al., "*International Development Trends in Low–Energy Cements*," Zement–Kalk–Gips, Edition B (English version), pp. 162, 165, Jun. 1988.

Von S. Sprung, "*Reducing environmental pollution by using secondary raw materials,*" Zement–Kalk–Gips, Edition B (English version), pp. 213–220, (No Month) 1992.

Günter Blunk et al., "*The use of steelmaking slags, represented by selected examples*," Stahl U Eisen 100, Nr. 3, Feb. 11, 1980.

P. Gooding et al., "*The Early History of Cement in England*," Proceedings of the Third International Symposium on the Chemistry of Cement, London, pp. 1, 20–27, (No month) 1952.

F. M. Lea, "*The History of Calcareous Cements*," The Chemistry of Cement and Concrete, 3rd Ed., pp. 1–10, (Date unknown).

S. N. Ghosh, "*Progress in Cement and Concrete*," Cement and Concrete Science & Technology, vol. 1, Part I, New Delhi, pp. 100, 102 (Date unknown).

M. Regourd, "*Slags and Slag Cements*," Instructional Modules in Cement Science, pp. 94–111, (Date unknown).

W. A. Klemm, "*Cementitious Materials: Historical Notes,*" Materials Science of Concrete, pp. 1–26 (Date unknown).

R. Kondo et al., "*Fuel Economized Ferrite Cement Made From Blastfurnace and Converter Slags,*" U.S. Bureau of Mines and IIT Research Institute, Proceedings of the Fifth Mineral Waste Utilization Symposium, Chicago, pp. 329–340, Apr. 13–14, 1976.

N. I. Kogan et al., "*The Use of Waste Slag from the Rustavi Metallurgical Plant in Cement Industry,*" Proceedings of the Institute Intensifying the Process of Calcining Clinker in Rotary Kilns, USSR, Ministry of the Building Materials Industry, No. 88, Moscow, pp. 15–26, (No month) 1986.

N. P. Kogan et al., "*Intensification of the process of producing cement clinker by calcining a batch consisting of independent starting physicochemical systems,*", Doklady adademii nauk SSSR, vol. 238, No. 2, pp. 408–410, (No month) 1978.

H. M. Javoronkov et al., "*Clinkerization with Low Consumption of Energy During Firing of Mixtures Containing Unground Slag,*" 8$^{th}$ International Congress on the Chemistry of Cement, Rio de Janeiro, vol. 11, pp. 1–3, Sep. 22–27, 1986.

R. Kondo et al., "*Iron Cement Made from Blastfurnace and Converter Slags,*" Review of the Twenty–Eighth General Meeting–Technical Session, The Cement Association of Japan, 8th International Congress on the Chemistry of Cement, pp. 66–68, May 1974.

W. Baoxun, "*Investigation on the Clinker Formation Process, Using Steel Slag as a Raw Material,*" Proceedings of the 1985 Beijing International Symposium on Cement and Concrete, Chinese Silicate Society in cooperation with China Association for Science and Technology, pp. 248–259, May 14–17, 1985.

D. W. Lewis, "*Properties and Uses of Iron and Steel Slags,*" Symposium on Slag, National Institute for Transport and Road Research, South Africa, pp. 1–8, Feb. 23, 1982.

D. W. Lewis, "*Resource Conservation by Use of Iron and Steel Slags,*" Extending Aggregate Resources, American Society for Testing and Materials STP 774, pp. 31–42, (No month) 1982.

D. G. Montgomery et al., "*Engineering uses of steel slag–a by–product material,*" (Date unknown).

W. S. Adaska et al., "*Solidification and Stabilization of Wastes Using Portland Cement,*" Portland Cement Association, pp. 10–16, (No month) 1991.

D. M. Roy, "*Portland Cement: Constitution and Processing; Part I: Cement Manufacture,*" Pennsylvania State University, pp. 51–63, (Date unknown).

J. J. Emery, "*Slag Utilization in Pavement Construction,*" Extending Aggregate Resources, American Society for Testing and Materials, pp. 95–118 (No month) 1982.

Chart: *Comparison of Chemical and Physical Properties––Three Types of Steel Slag*, National Slag Association, MF 185–3 (Date unknown).

G. Wang, "*Properties and Utilization of Steel Slag in Engineering Applications,*" a thesis submitted in fulfillment of requirements for Doctor of Philosophy, University of Wollongong, (No month) 1992.

(Author Unknown), "*Steel Slag,*" User Guidelines for Waste and By–Product Materials in Pavement Construction, Publication No. FHWA RD 97–148; U.S. Department of Transportation, Federal Highway Administration, Apr. 1998.

W. Watson et al., "*Proportioning of Raw Mixtures,*" Cement Chemists and Works Managers Handbook, Section IX, pp. 68–75, (No month) 1962.

F. M. Lea, "Portland Cements: Raw Materials and Processes of Manufacture," The Chemistry of Cement and Concrete, pp. 20–21, 468–469, (No month) 1970.

S. H. Kosmatka et al., "Design and Control of Concrete Mixtures," Portland Cement Association Engineering Bulletin, 13th Ed., pp. 3–15, 189–202, (No month) 1988.

G. W. Josephsoon et al., "Iron Blast–Furnace Slag: Production, Processing, Properties, and Uses," Bureau of Mines, U.S. Department of the Interior, Bulletin 479, (No month) 1949.

Author Unknown, "Processed Blast Furnace Slag–The All–Purpose Construction Aggregate," National Slag Association, pp. 2, 15 (Date unknown).

W. Gutt et al., "Use of waste materials in the construction industry," Analysis of the RILEM Symposium by Correspondence, Materiaux at Constructions, vol. 12, No. 70, pp. 255, 278–281, (No month) 1979.

Thomas M. Barnes et al., "Use of Lime Values in Steelmaking Slag Wastes," Proceedings of the $7^{th}$ Mineral Waste Utilization Symposium, U.S. Bureau of Mines and IIT Research Institute, Chicago, Oct. 20–21, 1980.

Chart: Nippon Slag Associaton, Utilization of Ironization of Iron and Steel Slag in Japan, (Date unknown).

O. P. Mchedlov–Petrosyan et al., "Coarse–grained Slags as an Additional Constituent of the Cement Raw Mix," Col'loque International Sur Les Laitiers et Ciments Aux Ajouts, (No month) 1981.

A. H. Fieser, "Slag and Slag Cement Practices in Japan," International Conference on Slag and Blended Cements, University of Alabama in Birmingham School of Engineering, pp. 6, 13–15, Feb. 18–19, 1982.

Slag Utilization Manual, China Steel Corp., pp. 1–10, (Date unknown).

J. Geiseler, "Steel Slag –'generation, processing and utilization'," International Symposium on Resource Conservation and Environmental Technologies in Metallurgical Industries, Toronto, pp. 87–97, (No month) 1994.

B. A. Wills, "Communition," Mineral Processing Technology, 4th Ed., pp. 200–211, (No month) 1988.

A. C. Broughton, "Scrap Tires: a burning issue," Recycling Today, Aug. 1993.

T. Gray, "Tire Derived Fuel: An Environmentally Friendly Resource," Rubber Recycling Symposium, $74^{th}$ Annual Meeting of the Rubber Association,. Toronto, Mar. 3, 1994.

F. P. Glasser, "Chemical, Mineralogical, and Microstructural Changes Occurring in Hydrated Slag–Cement Blends," Materials Science of Concrete II, The American Ceramic Society, Inc., (No month) 1991.

S. I. Ivanschenko et al., "Utilizing Copper Smeltery Slag as Mineral Additive," NIITsement, Nizhnetagilsky tsementny zavod, (No month) 1979.

Jacque Piret et al., "Utilizing LD–Slag for the Production of Portland Cement Clinker and Pig Iron," Journal of Manufacture and Processing of Iron and Steel, 16/84, Aug. 13, 1984.

W. Kuredovski, et al., "Sinterability of Raw Material Compositions Including Blast Furnace Slag," Cement Lime Gypsum, No. 11–12, pp. 2–10, Nov.–Dec. 1989.

R. Dogadzhiska et al., "Use of Slag From Kremikovtsky Metal Works for the Production of Portland Cement Clinker," Bulgaria, NIISM, VkhTI, Sofia, pp. 1–3, (Date unknown).

I. P. Kogan et al., "Intensification of the Process of Preparation of Cement Clinker by Roasting Batch That Consists of Independent Starting Physical and Chemical Systems," USSR Academy of Sciences, vol. 238, No. 2, pp. 1–2 (No month) 1978.

N. M. Zhavoronokov et al., "Clinker Preparation with Low Energy Consumption by Roasting Mixtures Containing Non–Ground Slag," $8^{th}$ International Congress on the Chemistry of Cement, USSR Academy of Sciences, Rio de Janeiro, pp. 1–6, (No month) 1986.

J. M. Levert et al., "Utilizing LD Slag in the Manufacture of Portland Cement," Conference on Slag and Cement and Cement with Additives, Silicates Industriels, Belgium, pp. 1–6, (No month) 1982–1.

V. S. Gorshkov et al., "Complex Processing and Use of Metallurgical Slags in Construction Industry," Moscow, Strojizdat Publishers, pp. 1–5, (No month) 1985.

P. P. Gaidzhurov et al., "Study on the Formation and Properties of Cement Clinker Produced on the Basis of Converter Slags," Chemistry and Chemical Engineering, vol. 33, Issue 3, Proceedings of Institutions of Higher Education, Publications of Ivanova Chemical and Technological Institute, (No month) 1990.

F. Puertas et al., "Modification on the Tricalcium Aluminate Phase in Cements by Manganese Substitution," Cement and Concrete Research, vol. 18, pp. 837–842, (No month) 1988.

S. C. Ahluwalia et al., "Effect of Low Grade Fuels, Combustible Wastes and Non–Traditional Raw Materials," National Council for Cement and Building Materials, 9th International Congress on the Chemistry of Cement, vol. 1, New Delhi, pp. 837–842, (No month) 1992.

P. Liebl et al., "Benefits and limitations when using secondary materials," Process Technology of Cement Manufacturing, Kingress Verein Deutscher Zementwereke e.V., Dusseldorf, (No month) 1993.

F. Puertas et al., "Reactivity and Burnability of Raw Mixes Made with Crystallized Blastfurnace Slags–Part I," Zement–Kalk–Gips, (41 Jahrgang), Nr. 1, pp. 398–402, 1988.

F. Puertas et al., "Reactivity and Burnability of Raw Mixes Made with Crystallized Blastfurnace–Slags–Part II," Zement–Kalk–Gips, (41 Jahrgang), Nr. 1, pp. 628–631, 1988.

I. Odler, "Improving Energy Efficiency in Portland Clinker Manufacturing," Progress in Cement and Concrete, Cement and Concrete Science & Technology, vol. I , Part I, pp. 174–200, (No month) 1991.

V. K. Gore et al., "Conservation of Raw Material Through Use of Industrial Wastes in Cement Manufacture," 9th International Congress on the Chemistry of Cement, Chemistry, Structure, Properties and Quality of Clinker, vol. II, New Delhi, pp. 238–244 (No month) 1992.

A. Dasgupta, "On Making a Special Cement Clinker Using Indian Blast Furnace Slag as a Raw Material," Technology, vol. 12, No. 1, pp. 61–64, (No month) 1975.

R. S. Boynton, "Limestone Uses," Chemistry and Technology of Lime and Limestone, $2^{nd}$ Ed., pp. 115–117, (No month) 1980.

J. Grzymek, "The Combined Methods of Cement Production," The VI International Congress on the Chemistry of Cement, Moscow, pp. 3–67, Sep. 1974.

G. K. Moir et al., *"Mineralisers, Modifiers and Activators in the Clinkering Process,"* 9th International Congress on the Chemistry of Cement, vol.1, New Delhi, pp. 125–143, (No month) 1992.

D. B. N. Rao et al., *"Activity and utilization of slag in OPC influenced by advanced grinding,"* World Cement, vol. 20, No. 6, pp. 205–206, Jun. 1989.

R. F. Blanks et al., *"The Manufacture of Portland Cement,"* The Technology of Cement and Concrete, vol. I, pp. 98–105, (No month) 1955.

H. Okumura, *"Recycling of Iron–and Steelmaking Slags in Japan,"* First International Conference on Processing Materials for Properties, pp. 803–806, (Date unknown).

H. Miyairi et al., *"Ceramic Uses of Blast–Furnace Slag,"* Nippon Steel Technical Report, No. 17, . pp. 112–118, Jun. 1981.

F. P. Maroto et al., *"Use of Blast–Furnace Slag as Raw Mix in the Obtaining of Cement and the Modification of its Phases with Manganese Hydration Reactions,"* Informes de la Construccion, vol. 39, Nov./Dec. 1987.

L. Changhua, *"The Effect and Principle of Industrial Wastes Used in Wet Rotary Kiln,"* pp. 636–640, (Date unknown).

C. C. Solomon, *"Annual Report–Slag–Iron and Steel,"* U.S. Department of the Interior, Bureau of Mines, (No month) 1993.

J. Beretka et al., *"Hydraulic Behaviour of Calcium Sufoaluminate–Based Cements Derived from Industrial Process Wastes,"* Cement and Concrete Research, vol. 23, pp. 1205–1214, (No month) 1993.

Broyage, *"High Efficiency Vertical Mills For Cement Clinker and Slag,"* Cement, Betons, Platres, Chaux, N°806, Jan. 1994.

N. Kogan et al., *"The Reduction of specific heat and electrical energy consumption by the use of waste from metallurgical processes as cement raw mixture components,"* Proceedings of the $7^{th}$ International Congress on Construction Materials and Silicates, Weimer (German Democratic Republic) (No month) 1979.

N. M. Zhavoronkov et al., *"Theoretical Substantiation of the Use of New Types of Raw Material in the Cement Industry,"* Doklady akademin nauk SSSR, vol. 245, No. 3, pp. 666–669, (No month) 1979.

M.–Moranville–Regourd, *"Cements Made From Blastfurnace Slag,"* Lea's Chemistry of Cement and Concrete, 4th Ed. (Date unknown).

Photographs: *Clinker textures*, Lea's Chemistry of Cement and Concrete, $4^{th}$ Ed.

Sersale, et al., *"A Study on the Utilization of an Italian Steel Slag,"* $8^{th}$ International Congress on the Chemistry of Cement, Rio de Janeiro, pp. 194–198, Sep. 22–27, 1986.

\* cited by examiner

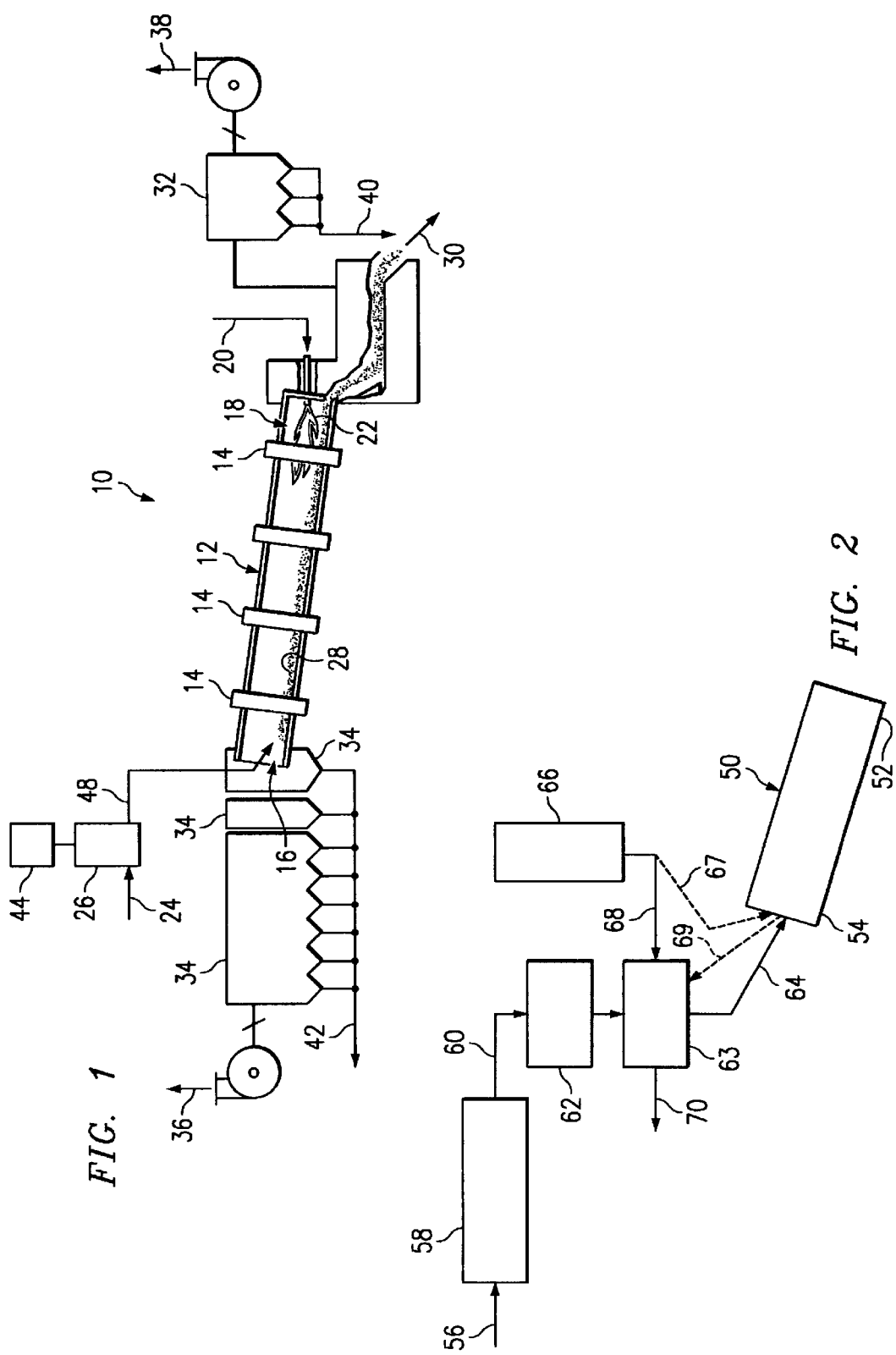

PROCESS FOR USING MILL SCALE IN CEMENT CLINKER PRODUCTION

BACKGROUND OF THE INVENTION

1. Field of the Invention

The invention relates in general to the manufacture of cement clinker in rotary kilns and, in particular, to the method of using mill scale in the production of cement clinker.

2. State of the Art

As stated in U.S. Pat. No. 5,156,676, the literature is replete with processes by which the calcining and clinkering of cement ingredients can be accomplished.

With the great concern for environmental protection today, processes have been developed to utilize waste products of every kind that might pollute the environment. Thus, in commonly assigned U.S. Pat. Nos. 5,494,515 and 5,421,880, incorporated by reference herein in their entirety, processes are disclosed in which steel slag and blast furnace slag, potential polluters of the environment, can be used in the production of cement clinker, thus avoiding a major disposal problem for the manufacturer thereof because of the large volumes of material involved.

In a like manner, during the processing, milling, and/or forming of steel, a waste product, known in the industry as "mill scale", is created. This mill scale presents a potential environmental disposal problem. In 1997, the estimated volume of mill scale was 3,670,000 tons. This mill scale flakes off the steel as it is being formed and contains chemical elements that are necessary in the art of making cement clinker. The mill scale obtained from carbon and alloy steel casting and rolling mill operations has been shown to contain predominantly various iron oxides, and minor or trace amounts of silicon oxide, aluminum oxide, calcium oxide, magnesium oxide, lead oxide, titanium oxide, cadmium oxide, chromium oxide, copper oxide, nickel oxide, manganese oxide, and zinc oxide.

The mill scale, when it is generated often accumulates a coating of hydrocarbons such as oil, grease, and the like. Tests have shown that the hydrocarbons (oil and grease) are in amounts of about 0% by weight to about 1% or more. Such hydrocarbons, of course, are deleterious to the environment and must be remediated. Thus, a first disadvantage in using mill scale in the production of cement clinkers is the necessity of removing any hydrocarbons that may be present.

Further, in the prior art process, as far as is known, when the mill scale is attempted to be used in making cement clinkers, it is first finely ground with the other feed stock materials. Because of the physical composition of mill scale, i.e. flakes, the inventors herein have found that it is not necessary to grind and reduce the particle size. However, in the prior art, it typically is mixed with the other feedstock materials and ground with them. This pulverized mixture is then placed into blending equipment where the mill scale and other feed stock materials experience additional mixing and blending. A substantially uniform blend of feed stock material is highly desired in the production of quality cement clinker. A 100% uniform blend is extremely difficult to achieve and is rarely accomplished. This is true probably because of physical constraints on the blending equipment and each of the constituent feedstock materials is of slightly different size, shape, and density. During the blending process, air, used as a blending agent, can be blown through the ground material, including the mill scale if it is added. However, the various components, and in particular the mill scale, probably because of its particle size and bulk density of at least 125 #/ft$^3$., which is a greater density than any of the feed stock components presently used, have a tendency to segregate. The mill scale, in particular, does not uniformly blend with the other feed stock materials and thus causes a greater variation in the blend of the kiln feed. This segregation of the materials fed into the kiln causes an undesirable non-uniform creation of the cement clinkers. Therefore, a second disadvantage incurred in the prior art process of using mill scale in the production of cement clinker is the difficulty in obtaining a substantially uniform blend of feed stock material because the mill scale has a natural tendency to segregate itself from the other feed stock materials.

After the attempt to blend the mill scale with the other feedstock materials, the "blended" feedstock materials are preheated with sufficient heat to volatilize the hydrocarbons but not destroy them by burning so they are passed to the atmosphere where they act as pollutants. Some States, such as California, using emission restrictions, effectively restrict the use of mill scale in the making of cement clinker in rotary kiln systems because any hydrocarbons that may be associated with the mill scale are not destroyed. Therefore, the cement clinker manufacturers, to keep operating have to purchase and use iron ore to mix with the other feedstock materials. This is not only costly, but it also discourages recycling of mill scale, a product that, recycled in the prior art manner, is potentially environmentally unacceptable.

It would be advantageous to have a system for using mill scale to make cement clinker wherein the detrimental hydrocarbons are destroyed in the process and wherein cement clinkers of substantially uniform quality can be formed.

SUMMARY OF THE INVENTION

The present invention provides a process for using mill scale in the production of quality cement clinker without the creation of polluting by-products from any hydrocarbons associated with the mill scale.

Further, the novel invention enables a more uniform quality cement clinker to be formed by avoiding the steps of grinding and blending the mill scale with the remaining feedstock materials.

The novel process is accomplished, in part, by grinding and blending the feedstock materials without the mill scale. The ground and blended feedstock material may then fed into a preheater structure where the temperature of the feed inlet part of the preheater is in the range of from about 500° F. to about 1700° C. (260° C.–927° C.) and is sufficiently high to preheat the feedstock material. Thus, any calciner equipment present in the system is separate from (and not a part of) a rotary kiln and is coupled to the preheater structure to receive the preheated feedstock material and raise the temperature of the preheated feedstock material to a range of from about 1500° F. to about 2300° F. (815° C.–1260° C.). The preheated and partially-to-predominantly calcined feedstock material is then fed into the feed end of the rotary kiln. The volatilized gases are burned after they have been volatilized by some heat zone such as the calciner itself or the feed end of the rotary kiln. In one preferred embodiment of the invention, the mill scale is also fed directly and separately into the feed end of the rotary kiln along with the feedstock materials. The temperature at the feed end of the kiln may be in the range of about 1500° F. to about 2300° F. (815° C.–1260° C.). This temperature profile of the kiln is sufficiently high to not only volatilize the hydrocarbons, but also to combust and destroy the volatilized hydrocarbons. It takes burning with small amounts of oxygen, and not just heat, to destroy the volatilized hydrocarbons.

In another preferred arrangement, the hydrocarbons (a fuel) are volatilized in the feed end of the rotary kiln which has a temperature profile insufficient to burn the volatilized gases. Therefore, they are coupled back to the calciner where coal (or some other fuel) is burned and here the volatilized hydrocarbons (now a combustible fuel) from the mill scale are destroyed by burning (combustion) in accordance with well-known chemical reactions that form carbon dioxide and water vapor ($CO_2+H_2O$). The fuel value of the volatilized hydrocarbons from the mill scale allows the use of a proportionally lower amount of the main calciner fuel. This fuel exchange means that the combusted hydrocarbons not only are converted to harmless products that do not contribute to the pollution of the environment but also they reduce usage requirement for the main fuel. The rate at which the mill scale is substantially uniformly fed into the feed end of the rotary kiln is determined by analyzing the quality of the cement clinker being formed and adjusting the feed rate of the mill scale to obtain the desired quality.

In yet another embodiment of the invention, the mill scale is fed directly and separately into a heat zone, such as a calciner, where it is heated to a temperature in the range of from about 1500° F. to about 2300° F. (815° C.–1260° C.). This temperature is sufficiently high to volatilize the hydrocarbons and form a combustible fuel. In addition, the burning (combustion) that takes place (in the calciner or in any other area in the system where combustion takes place) reduces the volatilized hydrocarbons (fuel) as explained above to $CO_2+H_2O$, harmless products that, as stated earlier, do not contribute to pollution of the environment and replace equivalent amounts of the other fuel that is being used in the calciner.

In still another embodiment of the invention, a more uniform quality cement clinker is obtained even though the hydrocarbons are only volatilized but not burned in the feed end of the rotary kiln because the temperature profile of the rotary kiln is not sufficient to burn the volatilized hydrocarbons. However, the mill scale is introduced into the feed end of the rotary kiln separately from the feedstock material and in a substantially uniform manner such that cement clinker of a substantially uniform quality can be obtained.

Thus, it is an object of the present invention to utilize mill scale in the production of cement clinker in a rotary kiln system containing preheating and/or calcining equipment.

It is also an object of the invention to utilize mill scale in the process of cement clinker manufacture without any additional production of harmful or unwanted pollutants.

It is a further object of the present invention to utilize mill scale in the production of cement clinker in a rotary kiln in which the preheater/calciner unit is in a structure that is separate from, and not within, the rotary kiln. Although the invention is described as used with a dry process rotary kiln, the system can be used with any cement clinker producing system in which the mill scale can be introduced into a sufficiently hot area with sufficient amounts of oxygen to accomplish the burning and destruction of the volatilized hydrocarbons.

It is still another object of the present invention to volatilize and destroy the unwanted mill scale hydrocarbons so that additional unwanted pollutants are not generated.

It is also an object of the present invention to keep the mill scale separate from the blended feedstock as the feedstock is coupled or fed into combustion areas so that any hydrocarbons associated with the mill scale will not only be volatilized but also destroyed by combustion.

It is yet another object of the present invention to feed the mill scale and the blended feedstock material separately into a kiln system so that a more uniform cement clinker may be produced.

Thus, the invention relates to a process for using mill scale, which may have hydrocarbons associated therewith, in the production of cement clinker using a rotary kiln system having a rotary kiln with a feed end and a heat end, comprising the steps of blending and preheating feedstock material; transferring the blended and preheated feedstock material to an area in the rotary kiln system where combustion is taking place; adding an amount of mill scale to the blended and preheated feedstock material in the combustion area where the hydrocarbons are volatilized and consumed by the combustion; and blending and diffusing the feedstock materials and the mill scale from the combustion area as they move from the feed end of the rotary kiln to the heat source end thereby forming cement clinker at the heat end of the rotary kiln.

BRIEF DESCRIPTION OF THE DRAWINGS

These and other features of the present invention will be more fully disclosed when taken in conjunction with the following Detailed Description of the Invention in which like numerals represent like elements and in which:

FIG. 1 is a basic diagrammatic representation of a rotary kiln system of the prior art in which the feedstock material, along with other additives such as steel or blast furnace slag, may be introduced into the rotary kiln; and FIG. 2 is a diagrammatic representation of the rotary kiln system of the present invention in which mill scale is preferably introduced into the feed end of the rotary kiln in a substantially uniform manner separately from and in addition to the preheated and calcined feedstock material as part of the process of forming cement clinkers and in which is also shown an alternate embodiment of the invention in which the mill scale is substantially uniformly fed directly into the calciner (or into an area in the kiln system where combustion takes place) separately but in conjunction with the feedstock material and then into the feed end of the rotary kiln.

DETAILED DESCRIPTION OF THE DRAWINGS

The apparatus of the prior art is illustrated in FIG. 1. The apparatus 10 includes the rotary kiln 12 supported in a well-known manner by steel tires 14 that rotate with the kiln 12. The kiln 12 has a feed-end 16 and a heat source-end or burning zone 18. The heat source-end 18 is tilted downwardly with respect to the feed-end 16 as is well known in the art. A fuel source 20 creates a flame 22 in the heat-end 18 of the rotary kiln 12 to provide a temperature of about 2550° F. to about 2800° F. (1400–1550° C.). Finely ground and blended cement raw materials or feedstocks such as limestone, clay, sand, and the like are transported at 24 to the feed-end 16 of the rotary kiln 12. The feedstock moves in a stream 28 through the rotating kiln 12 toward the flame 22. Well-known chemical processes take place within the kiln 12 and the cement clinker 30 exits the heat source-end 18 of the kiln 12 for further processing. Pollution control devices 32 and 34, well known in the art, are at the heat source-end and feed-end, respectively, of the kiln 12. At the heat source-end 18, out of the pollution control device 32, clean waste gases are expelled to atmosphere and reclaimed products 40 are recovered.

At the feed-end 16, the pollution control equipment 34 cleans the exhaust gases 36 which are expelled and reclaims the captured feed products at 42.

Attempts have been made to use mill scale in conjunction with the feedstock material to form cement clinker. In such attempts, the mill scale 44 is fed to a grinder/blender 26 (shown as one unit for simplicity; however, they may be separate units) where it is attempted to be ground to a fine state along with the feedstock material and then blended with the other feedstock material 24. As stated earlier, a substantially uniform blend of feedstock material is desired in the production of quality cement clinker. However, for some reason, possibly its very high density, the mill scale has a tendency to segregate itself from the other feedstock material during blending. This is the first disadvantage that occurs with the attempt to use mill scale in the cement clinker manufacturing process.

The ground feedstock material, including the mill scale, is then introduced into the feed end 16 of the rotary kiln system. Since the feed end of the kiln is at a relatively low temperature when compared to the heat end of the kiln, and since the temperature increases from the feed end to the heat end, the hydrocarbons associated with the mill scale are volatilized near the feed-end and escape into the air as pollutants. This is the second disadvantage of the prior art process in attempting to use mill scale in the production of cement clinker. Also, as stated earlier, some governmental entities, such as the State of Calif., through emission regulations and restrictions, make the use of mill scale prohibitive in cement clinker production because of the pollution associated with the volatilization into the air of the hydrocarbons associated with the mill scale when this prior art process is employed. Also, as stated previously, the quality of the cement clinkers formed is not as consistently uniform as it should be because of the improper blending of the mill scale due to its tendency to segregate during the blending process.

The novel system shown and illustrated in FIG. 2 provides a process in which mill scale can be used in the making of cement clinker without the disadvantages of segregation and the escape of hydrocarbon volatiles into the atmosphere during the cement clinker production process. First, the mill scale does not have to be ground inasmuch as it is already in a fine state when it is generated in the steel making process. Secondly, any volatile hydrocarbons associated with the mill scale are used as fuel in the production process and are destroyed.

The rotary kiln 50 illustrated in FIG. 2 is known as a "preheater or precalciner" kiln system and is considerably shorter that the rotary kiln 12 of FIG. 1. The FIG. 2 rotary kiln can be shorter than the kiln 12 in FIG. 1 because the preheating and calcining of the feed stock is accomplished in at least one separate structure 62 (and 63) rather than inside the rotary kiln itself. Since there are various degrees of calcining that take place in actual practice, whenever the term "calcining", "precalciner", or "calciner", or any derivative thereof, is used herein, it is to be understood that it refers to any "degree of calcining" so long as combustion takes place.

In one preferred embodiment, the feedstock material at 56 is coupled to a grinder/blender 58 (shown as one unit although they may be separate units) where it is ground and blended in the usual manner. The output at 60 is coupled to a preheater 62 and from there to a calciner 63. The mill scale from supply 66 is coupled through transfer means 68 to the calciner 63 (or any other combustion area). Here the hydrocarbons on the mill scale are volatized by the heat (and form a combustible fuel) and are destroyed by combustion taking place within the calciner as explained earlier. The resulting harmless exhaust gases $H_2O$ and $CO_2$ are expelled to the atmosphere at 70. In an alternate embodiment, the mill scale from supply 66 is transferred at 67 directly into the feed end of the rotary kiln 50 at a substantially uniform rate. However, in this embodiment, when the mill scale is introduced into the feed end of the rotary kiln 50, the temperature profile of the rotary kiln at the feed end may be sufficiently high to only volatilize the hydrocarbons. But, as stated earlier, these gaseous fuels cannot be converted to $H_2O$ and $CO_2$ unless they are burned. Thus, the volatilized gases in this embodiment must be fed to a combustion area in the system such as the calciner 63 by transfer means 69 where burning of a fuel such as coal is taking place. There the volatized hydrocarbons (a fuel) are converted to $H_2O$ and $CO_2$ as products of combustion replacing proportional amounts of the primary fuel of the calciner, thus economizing the amount of fuel (such as coal) that must be used in the calciner. The converted products of combustion are harmless products, again expelled to the atmosphere at 70, and the remaining mill scale is then melted in the rotary kiln and thoroughly combined with the feedstock material as it moves down the rotary kiln 50, thus forming cement clinker. Thus, not only is the mill scale combined with the feedstock material in the rotating kiln but, also, any associated hydrocarbons are destroyed in the process.

In case the mill scale does not have hydrocarbons associated therewith, the feeding of the mill scale into the feed end of the rotary kiln at a substantially uniform rate (separate from the feedstock material) will still improve the quality of the cement clinker because the mill scale is not segregated from the rest of the feedstock material (caused by the blending process of the prior art) as discussed above.

Thus, the genius of the present invention, in one preferred embodiment, is to preheat and calcine the normal ground and blended feedstock material in a separate structure instead of within the rotating kiln and by separately adding the mill scale with any associated hydrocarbons to the feedstock material in the calciner where the associated hydrocarbons are volatilized and destroyed by the process of combustion into harmless gases as explained above. The calcined feedstock material and mill scale are then coupled to the feed end of the rotary kiln where they are thoroughly combined while moving through the rotary kiln.

In still another embodiment, where the temperature profile of the rotary kiln is such that hydrocarbons are volatilized and consumed by combustion at the feed end of the kiln, the blended and preheated feedstock material and the mill scale may be separately fed into the feed end of the rotary kiln.

While the invention has been disclosed in conjunction with a preferred embodiment, it is not intended to limit the scope of the invention to the particular form set forth but, on the contrary, it is intended to cover such alternatives, modifications, and equivalents as my be included within the spirit and scope of the invention as defined by the appended claims.

We claim:

1. A process for using mill scale, having hydrocarbons associated therewith, in the production of cement clinker using a rotary kiln system, comprising the steps of:

blending and preheating feedstock material;

transferring said blended and preheated feedstock material to an area in said rotary kiln system where combustion is taking place;

adding an amount of said mill scale to said blended and preheated feedstock in said combustion area where said hydrocarbons are volatilized and consumed by said combustion; and blending and diffusing said feedstock materials and mill scale from said combustion area as they move from said feed end of a rotary kiln in said rotary kiln system to said heat source end of said rotary kiln thereby forming cement clinker at the heat source end of said rotary kiln.

2. The process of claim 1 wherein said combustion area in said rotating kiln system is a calciner.

3. The process of claim 1 wherein said combustion area in said rotating kiln system is the feed end of said rotary kiln.

4. A process for using mill scale in cement clinker production using a rotary cement kiln system having a kiln feed end and a heat source end, the heat end being tipped downwardly with respect to the feed end, comprising the steps of:

directing heat from a heat source into said heat source end of said kiln;

introducing feedstock material into a blending system to cause the feedstock material to have a substantially uniform blend;

transferring said feedstock material into the feed end of said rotary kiln;

separately and continuously adding a substantially uniform amount of mill scale to the feed end of said rotary kiln with said feedstock material thereby enabling said feed stock material and said mill scale to be uniformly blended as they move toward said heat source end of said rotary kiln, said mill scale being combined into said feedstock material to form improved cement clinker having a substantially uniform quality.

5. The process of claim 4 further comprising the steps of:

utilizing mill scale that has hydrocarbons associated therewith;

volatilizing any such hydrocarbons in the kiln system; and transferring said volatilized hydrocarbon gases to a combustion area in the rotary kiln system where they are consumed by combustion according to a well-known chemical reaction to form $H_2O$ and $CO_2$, harmless gases that can be expelled to the atmosphere.

6. The process of claim 5 wherein said combustion area is a calciner.

7. The process of claim 5 wherein said combustion area is the feed end of a rotary kiln having a temperature profile sufficient to both volatilize and combust said volatilized gases.

8. A method of forming cement clinker in a rotary kiln with feedstock material and mill scale having unwanted hydrocarbons associated therewith, the method comprising the steps of:

preheating and calcining said feedstock material;

heating said mill scale to volatilize any said associated hydrocarbons;

burning said volatilized hydrocarbons to form harmless exhaust products that can be expelled to the atmosphere;

inserting said heated mill scale and said preheated and calcined feed stock material into the feed end of said rotary kiln; and combining said heated mill scale with said feedstock material as they move from said feed end to said heat source end of said rotary kiln thereby forming cement clinker.

9. The method of claim 8 wherein the step of burning said hydrocarbons further includes the step of burning said hydrocarbons in a calciner.

10. A method for using mill scale in the formation of cement clinker, comprising the steps of:

blending and preheating feedstock material necessary for making cement clinker;

continuously transferring said blended and preheated feedstock material to an area where combustion of a heating fuel is taking place;

continuously adding a substantially uniform amount of mill scale containing hydrocarbons associated therewith to said blended and preheated feedstock material in said combustion area;

volatilizing said hydrocarbons in said mill scale in said combustion area to form an additional heating fuel having an energy value;

burning the additional heating fuel formed by said volatilized hydrocarbons and utilizing the energy value of said additional heating fuel to supplement the heating fuel and allow a proportionally lower amount of the heating fuel to be used in said combustion area; and passing said feedstock material and said mill scale down said rotary kiln such that said feedstock material and said mill scale are thoroughly blended and diffused as they move from said feed end to said heat end of said kiln thereby forming cement clinker at the heat end of the rotary kiln.

* * * * *

UNITED STATES PATENT AND TRADEMARK OFFICE
CERTIFICATE OF CORRECTION

PATENT NO.    : 6,709,510 B1
DATED         : March 23, 2004
INVENTOR(S)   : Rom D. Young and David Norris It is certified that error appears in the above-identified patent and that said Letters Patent is hereby corrected as shown below:

Column 2,
Line 50, replace "1700º C." with -- 1700º F. --; and

Column 6,
Line 4, replace "$H_2 0$" with -- $H_2O$ --.

Signed and Sealed this

Thirty-first Day of August, 2004

JON W. DUDAS
*Director of the United States Patent and Trademark Office*